(12) United States Patent
Boschert

(10) Patent No.: US 6,699,535 B2
(45) Date of Patent: Mar. 2, 2004

(54) REPRODUCTIONS OF AQUARIUM LIFE FORMED FROM TRANSLUCENT MEMORY RETAINING POLYMERS AND METHOD FOR REPRODUCING THE SAME

(75) Inventor: Jeffrey D. Boschert, 16310 Shannon Rd., Los Gatos, CA (US) 95032

(73) Assignee: Jeffrey D. Boschert, Pleasant Hill, CA (US)

(*) Notice: Subject to any disclaimer, the term of this patent is extended or adjusted under 35 U.S.C. 154(b) by 0 days.

(21) Appl. No.: 09/976,663

(22) Filed: Oct. 15, 2001

(65) Prior Publication Data

US 2003/0072897 A1 Apr. 17, 2003

(51) Int. Cl.$^7$ .................................................. B44F 7/00
(52) U.S. Cl. ........................................ 428/15; 446/153
(58) Field of Search ..................... 428/15, 16, 907; 43/42, 42.24; D21/576; 446/153, 268

(56) References Cited

U.S. PATENT DOCUMENTS

| | | | |
|---|---|---|---|
| 4,061,910 A | * 12/1977 | Rosenfeld | ..................... 362/104 |
| 4,111,879 A | * 9/1978 | Mori et al. | ................... 524/104 |
| 4,369,216 A | * 1/1983 | Willinger | ..................... 248/27.8 |
| 5,018,480 A | * 5/1991 | Goldman et al. | ........... 119/468 |

OTHER PUBLICATIONS

The Thing–Maker page (www.snowcrest.net/fox/thing/html); 1995.*

* cited by examiner

Primary Examiner—Deborah Jones
Assistant Examiner—Arden Sperty
(74) Attorney, Agent, or Firm—Sidley Austin Brown & Wood LLP

(57) ABSTRACT

An article for use in an aquatic environment comprises a translucent polymer material that is configured to reproduce a form of aquarium life. In embodiments of the invention, the translucent polymer material comprises a highly pliable polymer material capable of substantially retaining its shape, such as, but not limited to, thermoplastics, rubbers, silicones, and Plastigoop®. In further embodiments of the invention, the form of aquarium life that the translucent polymer material is configured to reproduce can be a sea anemone, a sea plant, a sea weed, live coral, a scallop, a clam, a sea cucumber, a sea apple, a nudibranch, or a jellyfish. In another aspect of the invention, a process for reproducing articles configured to reproduce aquarium life comprises processing an appropriate polymer material, and in other embodiments, further processing one or more additives, such as dyes, whereby an article reproducing one or more types of aquarium life is formed.

19 Claims, 6 Drawing Sheets

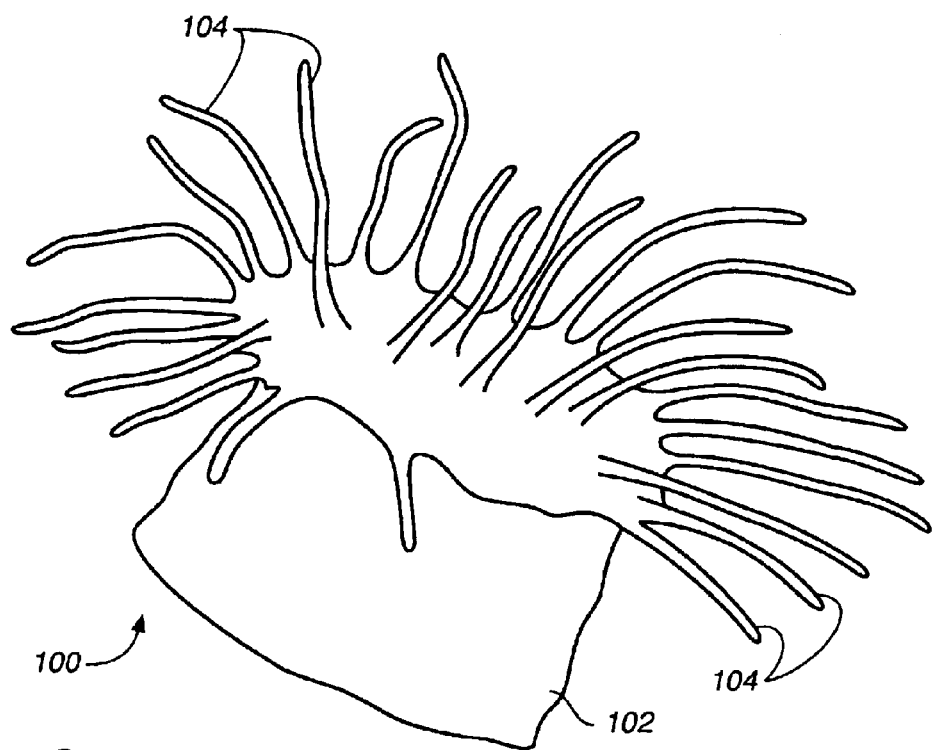
FIG._1
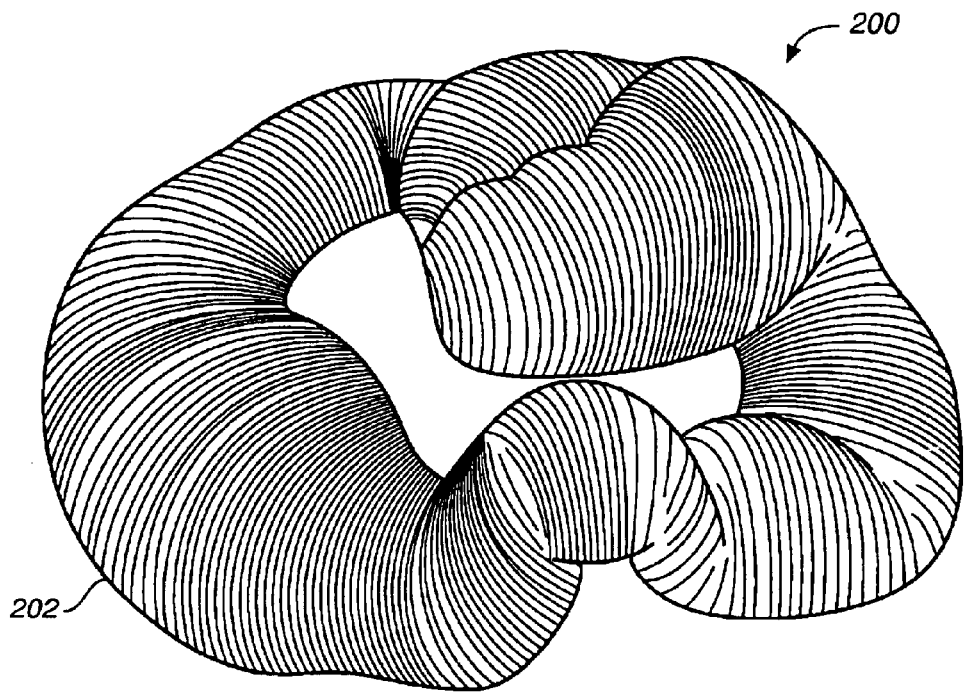
FIG._2

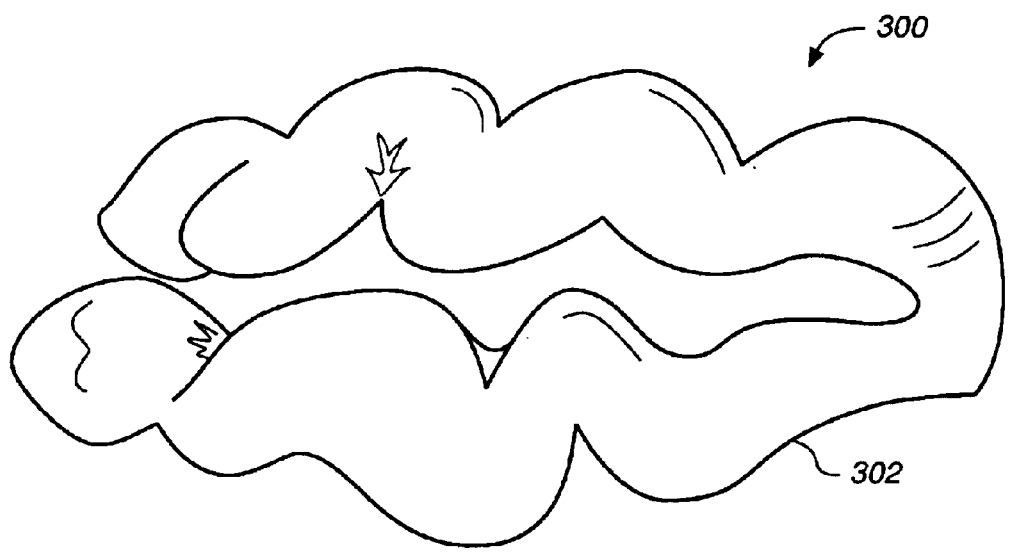
FIG._3
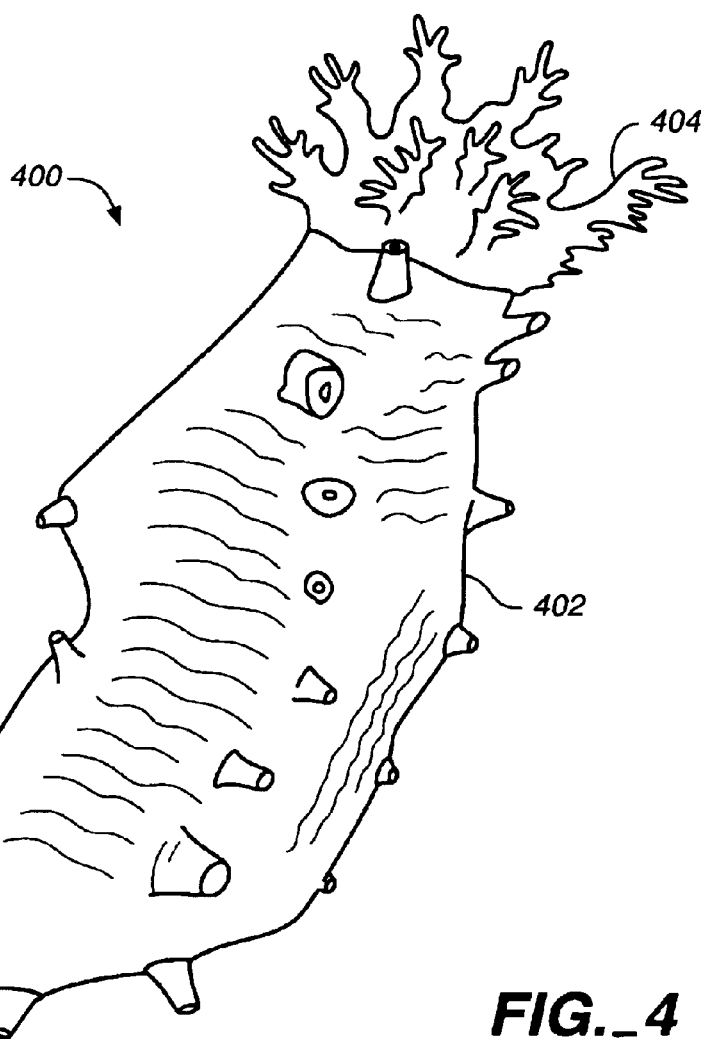
FIG._4

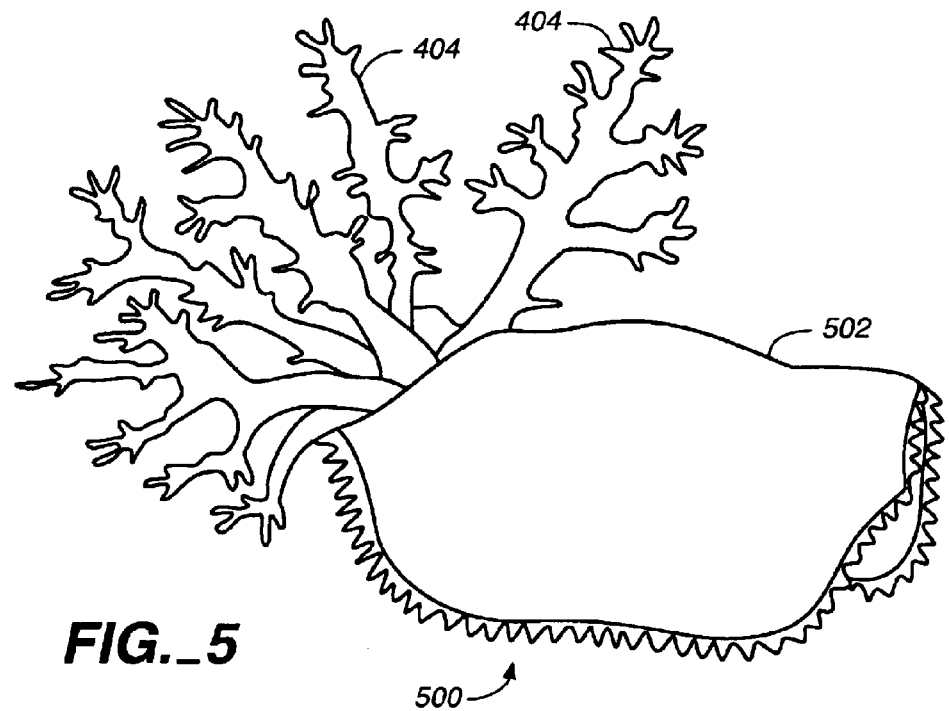
FIG._5
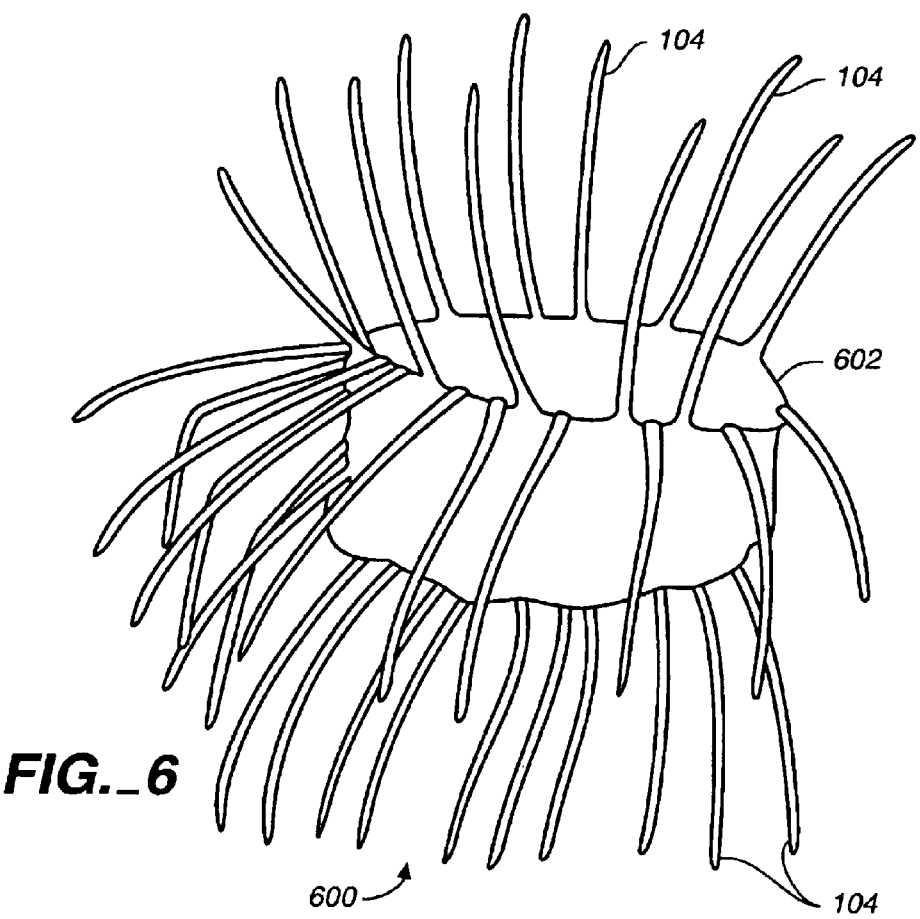
FIG._6

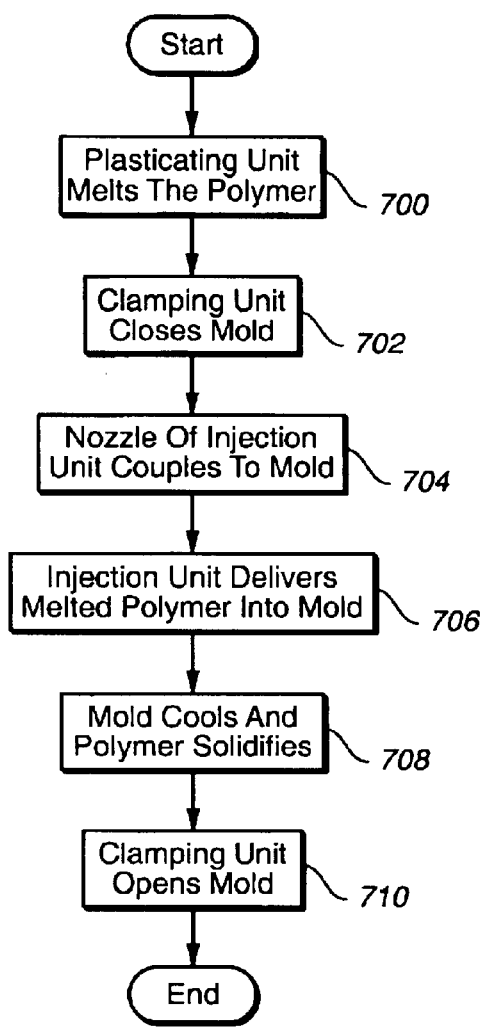
FIG._7
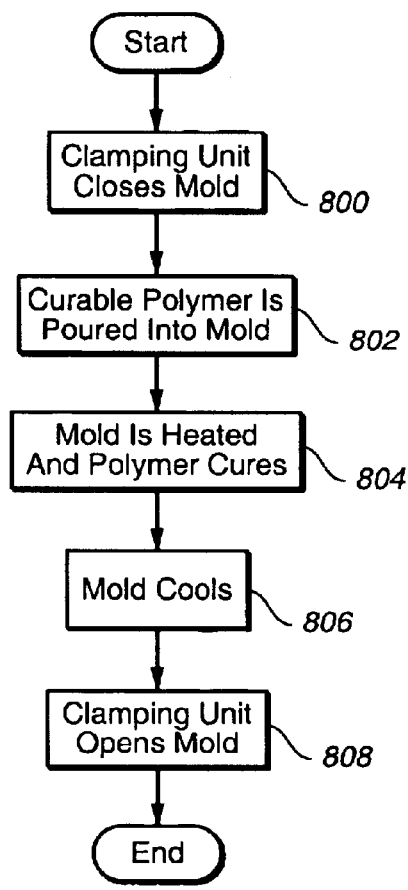
FIG._8

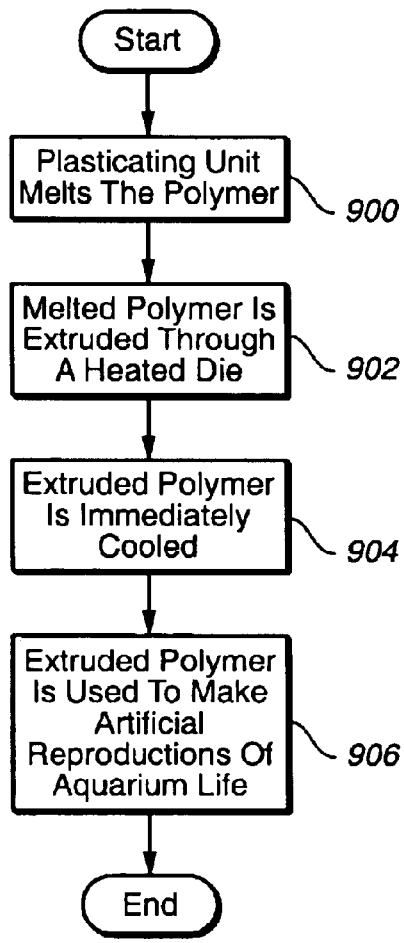
FIG._9
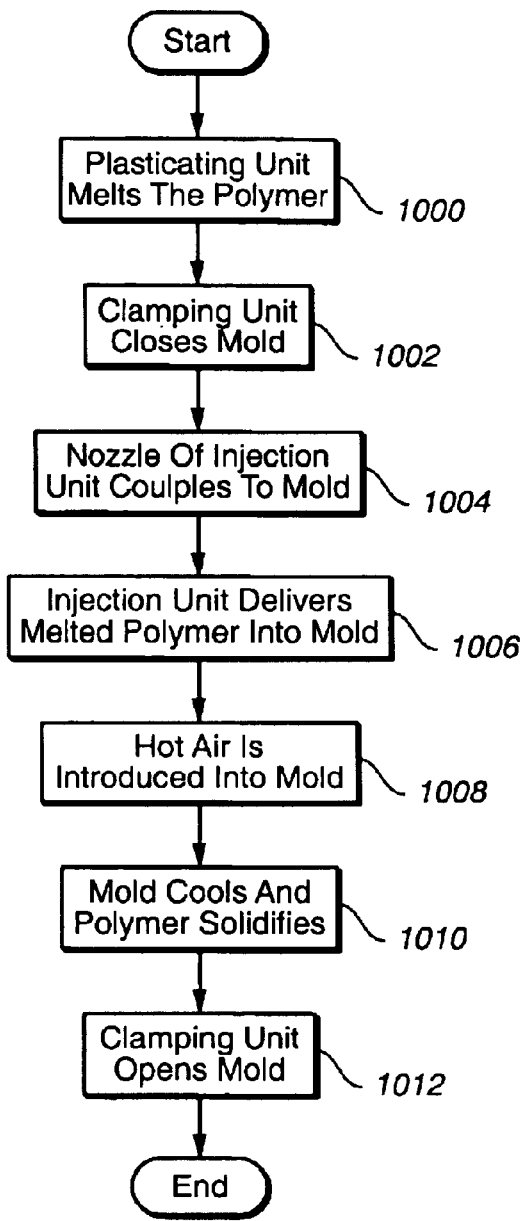
FIG._10

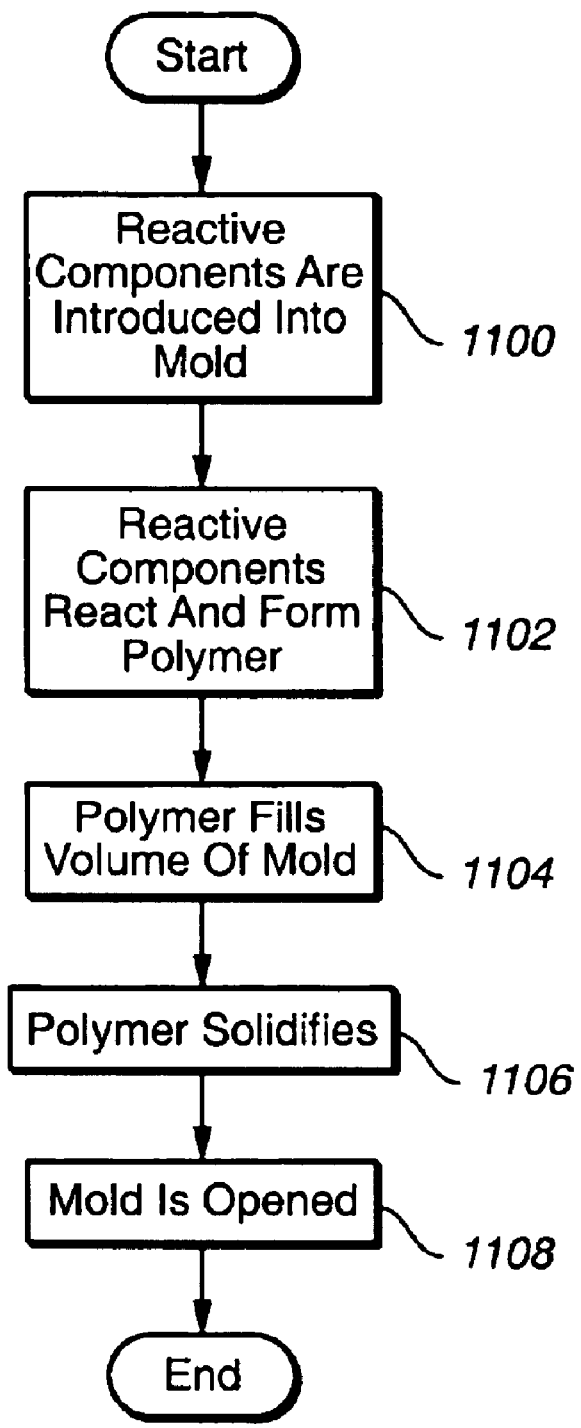
FIG._11

REPRODUCTIONS OF AQUARIUM LIFE FORMED FROM TRANSLUCENT MEMORY RETAINING POLYMERS AND METHOD FOR REPRODUCING THE SAME

BACKGROUND

1. Field of the Invention

The invention generally relates to the field of artificial aquatic plants and sea life, and more particularly, to reproductions of aquarium life formed from translucent memory retaining polymers, and methods for reproducing the same.

2. Background Information

Aquatic environments, such as aquariums, fish tanks, vivariums, or other aquatic displays, often contain any of an assortment of plants, shrubbery, and sea life as part of their landscape. These landscape displays can serve many uses, from beautifying the aquatic scenery to providing a stimulus for fish and other sea or amphibious creatures that inhabit the aquatic environment.

Live plants, such as sea weed, are often used in aquariums for a number of reasons. They are soft and provide a good stimulus for fish or other inhabitants, as fish will often play and interact with the plants. Also, live plants tend to gently sway and wave with the water as the water circulates within the aquarium. This motion by the live plants makes the overall appearance of the aquarium more pleasing, as well as providing a better stimulus for fish.

Similarly, live sea life is often used to beautify the landscape of an aquarium. Popular forms of sea life used in aquariums include sea anemones, corals, scallops, clams, sea cucumbers, and sea apples. These forms of sea life are particularly engaging because of their vibrant and luminous colors.

Unfortunately, there are a number of drawbacks associated with the use of live plants and live sea life in aquariums. Regarding live plants specifically, the environmental conditions necessary to allow live plants to thrive also tend to promote the growth of algae in the aquarium. This algae must either be treated chemically, physically cleaned, or hopefully eaten by the fish or other sea creatures living in the aquarium. Otherwise the water can become polluted and any glass walls in the aquarium tend to then become dirty. The growth of algae often requires the owner or care taker of the aquarium to change the water more frequently than may otherwise be necessary. Another drawback to live plants is that they require a lot of care. The proper lighting conditions, water hardness, and water temperature are all required to enable most live plants to thrive in an aquatic environment.

Some of the drawbacks to using live sea life are similar to those of live plants. Like live plants, live sea life must also have the proper lighting conditions, water hardness, and water temperature to thrive. Other drawbacks include the tendency of the live sea life to move about the landscape and reposition themselves in locations that are not ideal for viewing. For instance, sea anemones tend to move to the front of an aquarium and plant themselves against the smooth surface of the front pane of glass.

The common drawbacks of live aquarium life, namely their need for particular environmental conditions, can also present further problems. Since fish inhabiting an aquarium also require certain environmental conditions, problems can arise when the environmental conditions required by the live plants and sea life conflict with the environmental conditions required by the fish. Aquarium life must be found that can coexist in the same environment as required by the fish, and finding such plants and sea life can be a costly trial and error exercise. And in the case of live plants, once the proper plants are found, another problem that often arises is that the fish or other sea creatures will often feed on them. Thus, there are many drawbacks associated with the use of live plants and sea life in such aquatic environments.

Artificial plants are another option for use in aquariums. These plants are typically made from rigid plastics and do not suffer from the drawbacks of live plants, such as the accompanying algae growth, requiring certain lighting conditions, water hardness levels, and water temperature levels, and potentially being eaten by sea creatures inhabiting the aquarium. Unfortunately, known artificial plants are not as visually appealing as live plants due to their color, texture, and rigidity. Artificial plants tend to look artificial. Furthermore, known artificial plants do not add nearly the same level of beauty that the color and luminescence of sea life can provide to an aquarium. Accordingly, improved forms of artificial aquarium plants and life are desirable.

SUMMARY

The drawbacks and limitations of known live and artificial plants and sea life have been substantially improved upon by the present invention.

According to an embodiment of the invention, an article for use in an aquatic environment comprises a translucent polymer material that is configured to substantially resemble a form of aquarium life. In another embodiment of the invention, a translucent polymer material comprises a highly pliable polymer material capable of substantially retaining its shape. In further embodiments of the invention, a form of aquarium life that a translucent polymer material is configured to substantially resemble can be that of a sea anemone, a sea plant, a sea weed, live coral, a scallop, a clam, a sea cucumber, a sea apple, or a jellyfish.

These and other aspects of the invention will be more apparent in view of the following detailed description of the exemplary embodiments and the accompanying drawings thereof.

BRIEF DESCRIPTION OF THE DRAWINGS

FIG. 1 illustrates a reproduction of a live sea anemone according to an embodiment of the invention.

FIG. 2 illustrates a reproduction of a live coral according to an embodiment of the invention.

FIG. 3 illustrates a reproduction of a live clam according to an embodiment of the invention.

FIG. 4 illustrates a reproduction of a sea cucumber according to an embodiment of the invention.

FIG. 5 illustrates a reproduction of a sea apple according to an embodiment of the invention.

FIG. 6 illustrates a reproduction of an electric scallop according to an embodiment of the invention.

FIG. 7 is a flowchart illustrating a method for creating a reproduction of aquarium life using an injection-molding process in accordance with one aspect of the invention.

FIG. 8 is a flowchart illustrating a method for creating a reproduction of aquarium life using a curable polymer in accordance with one aspect of the invention.

FIG. 9 is a flowchart illustrating a method for creating a reproduction of aquarium life using an extrusion process in accordance with one aspect of the invention.

FIG. 10 is a flowchart illustrating a method for creating a reproduction of aquarium life using a blow molding process in accordance with one aspect of the invention.

FIG. 11 is a flowchart illustrating a method for creating a reproduction of aquarium life using a reactive polymer process in accordance with one aspect of the invention.

In the drawings, like features are typically labeled with the same reference numbers across the various drawings.

DETAILED DESCRIPTION

In one aspect, an embodiment of the invention comprises reproductions of a variety of forms of aquarium life that are made from translucent materials, and in particular, translucent, highly pliable polymers. The term "aquarium life" as used herein generally refers to plant life and sea life that can be added to an aquarium, or any other aquatic environment, for any intended use including, for example, the beautification of its landscape.

FIG. 1 illustrates a reproduction 100 of a sea anemone. Sea anemone reproduction 100 comprises a body 102 and a plurality of tentacles 104. As will be described below, body 102 and tentacles 104 may be formed, in one embodiment, from a translucent and pliable polymer material.

FIG. 2 illustrates a reproduction 200 of a coral. Coral reproduction 200 comprises primarily a body 202. Body 202 may also be formed, in one embodiment, from a translucent and pliable polymer material, as is described below.

FIG. 3 illustrates a reproduction 300 of a clam. Like sea anemone reproduction 100 and coral reproduction 200 above, clam reproduction 300 also comprises primarily a body 302 that may be formed, in one embodiment, from a translucent and pliable polymer material.

FIG. 4 illustrates a reproduction 400 of a sea cucumber, which comprises a body 402 and branches 404. Both body 402 and branches 404 may be formed, in one embodiment, from a translucent and pliable polymer material.

FIG. 5 illustrates a reproduction 500 of a sea apple, which comprises a body 502 and branches 404. Branches 404 for sea cucumber reproduction 400 and sea apple reproduction 500 can, in some embodiments, be either similar or identical. Again, both body 502 and branches 404 of sea apple reproduction 500 may be formed, in one embodiment, from a translucent and pliable polymer material.

FIG. 6 illustrates a reproduction 600 of an electric scallop. Electric scallop reproduction 600 comprises a body 602 and tentacles 104. Tentacles 104 in FIG. 6 may, in some embodiments, be either similar or identical to tentacles 104 of sea anemone reproduction 100 of FIG. 1. As with the other reproductions of FIGS. 1–5, body 602 and tentacles 104 of electric scallop reproduction 600 may, in one embodiment of FIGS. 1–5, be formed from a translucent and pliable polymer material.

In should be noted that all of the above forms of sea life come in a variety of different sizes, shapes, and colors. Also, the size, shape, color, and number of tentacles 104 and branches 404 may vary widely in various embodiments without departing from the scope of the invention. Moreover, the precise species or types of sea life reproduced need not be among those illustrated in FIGS. 1–6, and those of ordinary skill in the art will understand that there are many types of sea life which can be reproduced, including for example known sea life, without departing from the scope of the present invention. FIGS. 1 to 6 are merely representative examples of some of the variations that can be made, and should not be interpreted as limitations on the invention.

As mentioned above, an artificial reproduction of aquarium life in accordance with one embodiment of the invention may be formed from one or more polymer materials. The term polymer as used herein refers to any type of plastic, polyisoprene, silicone, fluorosilicone, rubber, or any resilient or elastic material, or any blend thereof, manmade or natural, and refers to any materials that have characteristics or traits similar to those specified below. The polymer materials chosen for use in forming reproductions of aquarium life must have a plurality of the following characteristics. One characteristic is that the polymer materials must be translucent. The use of a translucent polymer material allows dyes and pigments to be added to the polymer so that artificial aquarium life can be created that is colorful and lifelike, and that is a more accurate reproduction of actual aquarium life than can be made with conventional plastics.

The use of certain dyes or pigments, when added to a translucent polymer, can create fleshy tones that are associated with sea life such as, but not limited to, clams, scallops, jellyfish, nudibranchs, and sea anemones. For instance, some of these colors include, but are not limited to, muted shades of red, pink, orange, and brown. In some instances, the dyes or pigments can be used primarily in the interior portions of the sea life reproductions, while the exterior portions of the sea life reproductions remain translucent. This can provide the translucent-fleshy appearance that is often seen in these forms of sea life. Also, many forms of sea life, such as sea anemones, scallops, and jellyfish, have translucent features (e.g. tentacles 104) which can be reproduced using a translucent material.

Different colors can also be used to reproduce other forms of sea life, such as (but not limited to) sea cucumbers and sea apples. Some of these colors include, but are not limited to, blues, whites, reds, and purples. Even brighter colors, including but not limited to vibrant reds, blues, purples, yellows, a variety of fluorescent colors, and even glow-in-the-dark dyes, can be used in translucent polymers to reproduce still other forms of sea life, such as some types of live corals. In corals, the translucent, color-filled polymers can also be applied over a rigid interior structure that can be formed from a stiffer polymer or other material, thereby more truthfully reproducing live corals. In both of these instances, the exterior portions of the sea life reproductions can hold the dyes or pigments because the reproductions of sea cucumbers, sea apples, and corals often require a solid-fleshy, rather than a translucent-fleshy, type of appearance.

Another characteristic for the polymer materials is that they be either waterproof or able to endure long periods in an aquatic environment without substantially degrading. For instance, sponges are not considered to be waterproof but nevertheless thrive in aquatic environments. Many polymers are waterproof, and other polymers that are open-celled can survive underwater indefinitely.

Yet another characteristic for the polymers within the scope of the invention is that they be highly pliable or resilient or elastic. In other words, the polymers should have a soft and flexible texture. For instance, in one embodiment a polymer that has a supple feel to it and that is very malleable is preferred. Highly pliable polymers are beneficial because aquarium life such as plants and sea anemones tend to gently sway with any currents moving through an aquatic environment. Any reproductions of these forms of aquarium life made in accordance with embodiments of the invention should be able to move in a similar fashion. The use of soft, flexible, and pliable polymers can satisfy this requirement. For other reproductions of sea life, such as clams or scallops for instance, less pliable and indeed very rigid polymers can be used as these forms of sea life do not necessarily sway or move in currents underwater.

Regarding the polymers used in reproductions of aquarium life such as plants and anemones, the level of pliability can vary greatly. In aquarium life reproductions where movement is not necessary or desired, polymers with less pliability can be utilized. In aquarium life reproductions where it may be desirable for the aquarium life to sway with water currents or movements, then polymers with higher levels of pliability can be used. Polymers that have an almost gelatinous yet solid texture, much like a solid gel, are candidates for these forms of pliable aquarium life. An example of a polymer with these properties is sold under the brand name PLASTI-GOOP®(castable molding compound) by ToyMax, Inc. The PLASTI-GOOP®(castable molding compound) polymer is used in the Creepy Crawlers™ Bug Maker also sold by ToyMax, Inc.

Polymers used in the invention are able to retain their shape and are resilient enough to withstand typical stresses they may encounter in an aquatic environment. Such stresses may often include interactions with fish or other live sea creatures. The polymers should have a "memory" characteristic that allows them to substantially regain their original form after they have been subjected to stresses or strains from the aquatic environment.

Those of ordinary skill in the art will understand that any of numerous polymers can be used within the scope of the invention. Thermoplastics and elastomers are available that can provide the necessary properties. Some specific polymers that can be used include, but are not limited to, silicone, latex, polyethylene, polypropylene, polystyrene, polyurethane, polyvinyl chloride, and memory gels. It should be noted that thermoplastics or elastomers other than the ones previously mentioned can also be used, as long as a plurality of the properties mentioned above are satisfied. Since all of these polymers are available in different formulations, and since the different formulations will have varying characteristics that are dependent on factors such as density and chemical additives, those of ordinary skill will understand that specific formulations of each polymer may be suitable for use in the invention. For example, certain formulations of polyurethanes produce flexible foams that can be used in the invention to form reproductions of moving aquarium life, while other formulations of polyurethanes produce rigid foams that may not be suitable for some embodiments of the invention. Similarly, those of ordinary skill will understand that other polymers listed above will have certain formulations that yield the correct properties that make them candidates for use in the invention.

The artificial reproductions of aquarium life constructed according to embodiments of the invention can be formed by several different methods. The specific method used will primarily be determined by which polymer is chosen in making the reproduction. Some thermoplastic resins and elastomers, such as polypropylene, polystyrene, and polyurethane, can be formed using an injection-molding process. In such a process, melted polymer material is forcefully injected into a mold of the aquarium life being reproduced. The mold shapes the plastic into the desired form, and is generally comprised of two machined-aluminum or machined-stainless steel halves that are brought together before the polymer is injected. The polymer then cools and solidifies within the mold, and the aquarium life reproduction can then be removed.

FIG. 7 is a flowchart describing a typical injection-molding process for use with some aspects of the invention. At step 700, the injection-molding process typically begins with a plasticating unit that melts a translucent polymer material into a liquid form. The polymer may be available in a pellet form for this process. A screw within the plasticating unit may shear the polymer pellets as they are heated. At step 702, a clamping unit brings the two halves of the mold together and holds the mold closed during the injection process. At step 704, a nozzle of the injection unit is coupled to one or more holes in the mold through which the melted polymer can enter the mold. At step 706, the injection unit delivers melted polymer into the mold. Since most polymers tends to contract as they solidify, the injection molding machine will force extra polymer into the mold. This aids in causing the polymer to fill out the mold cavity when the polymer solidifies. At step 708, the mold is cooled to cause the polymer to solidify. Finally at step 710, the two halves of the mold are opened and one or more aquarium life reproductions can be removed. Those of ordinary skill will understand that the invention is not limited to the precise injection molding process utilized, and that variations in an injection molding process which are known may be used.

Different additives can be added to a polymer before or during the injection-molding process. For instance, in some embodiments of the invention, dyes or pigments can be added to a polymer melt prior to the polymer being injected into the mold. In other embodiments, dyes or pigments can be injected into a mold either before, during, or after the polymer melt is injected. The addition of dyes in these different manners can create a variety of desirable designs and effects. Swirls, dispersions, or explosions of color within the polymer can be created using such techniques. Also, the introduction of dyes into the mold either during or after the polymer injection can help create a translucent exterior with a colorful interior, if such an effect is desired. Those of ordinary skill will understand that addition of dyes or other additives may be accomplished in any of a variety of known methods and the invention is not limited by the specific method utilized.

According to another embodiment of the invention, a translucent curable polymer can be used to form reproductions of aquarium life. Examples of curable polymers include certain silicones and polyurethanes, as well as the PLASTI-GOOP®(castable molding compound) material described above. FIG. 8 is a flowchart describing a typical curable polymer molding process. Beginning at step 800, two halves of a mold are brought together. At step 802, the curable polymer is introduced into the mold. At step 804, the mold is heated to cause the polymer to cure and solidify. At step 806 the mold is cooled, and finally at step 808 the mold is opened and one or more aquarium life reproductions can be removed. As with an injection-molding process, dyes and pigments can be introduced into the curable polymer at different stages of the process to create colors or effects in the translucent polymer. Those of ordinary skill will understand that a curable polymer may be accomplished in any of a variety of known methods, and the invention is not limited by the specific method utilized.

According to yet another embodiment of the invention, an extrusion process can be used to form reproductions of aquarium life. An extrusion process is particularly suited for forming certain reproductions of plant life, as well as for forming tentacles 104 or branches 404 of sea anemone reproductions 100, scallop reproductions 600, and sea apple reproductions 500. FIG. 9 is a flowchart describing a typical extrusion process. At step 900, similar to an injectionmolding process described with reference to FIG. 7, an extrusion process may begin with a plasticating unit that melts a translucent polymer material into a liquid form. A screw within the plasticating unit may shear the polymer pellets as they are heated. At step 902, the melted polymer is forced through a heated die which extrudes the polymer into long strands. These strands can take on various forms according to the die used, including fibers, cylinders, and films. At step 904, the extruded polymer may be cooled to solidify the polymer in its extruded form. The cooling may typically be done by extruding the polymer directly into a bin or trough of water, which almost immediately solidifies the polymer. Finally at step 906, the extruded polymer may be cut and used to create tentacles 104, branches 404, or certain forms of plant life. Those of ordinary skill will understand that a polymer material may be extruded in any of a variety of known methods, and the invention is not limited by the specific method utilized.

A blow molding process can be utilized in still another embodiment of the invention. FIG. 10 is a flowchart detailing a blow molding process. Starting at step 1000, the polymer material is melted using a device such as the plasticating unit described above. At step 1002, a clamping unit brings the two halves of the mold together and holds the mold closed during the injection process. At step 1004, a nozzle of the injection unit is coupled to one or more holes in the mold through which the melted polymer can enter the mold. At step 1006, the injection unit delivers melted polymer into the mold. Next at step 1008, air is injected into the mold to cause the melted polymer to coat the interior walls of the mold. This air is generally heated prior to being delivered into the mold to prevent the polymer from beginning to solidify. At step 1010, the mold is cooled to solidify the polymer. Then at step 1012, the clamping unit opens the mold and the blow-molded polymer is removed. The resulting structure may be a hollow, translucent polymer shell in the shape of the mold. This technique can be used to form one or more hollow reproductions of aquarium life. The hollow cavities within the reproductions can be left empty, or they can be filled with a liquid or solid to create a desired color, texture, density, or other effect. For instance, a hollow shell can be filled with a colorful gel to give the reproduction a gelatinous feel. Or a translucent hollow shell can be used as a skin to be placed over another reproduction of aquarium life to create a translucent-fleshy look. Those of ordinary skill will understand that a polymer material may be blow molded in any of a variety of known methods, and the invention is not limited by the specific method utilized.

According to another embodiment of the invention, reproductions of aquarium life can be formed using reactive polymers. For instance, certain polymers such as polyurethanes can be formed by reacting two components, for example an isocyanate and a polyol. FIG. 11 is a flowchart describing a reactive polymer process. At step 1100, the two or more components intended to react and form a polymer are introduced into a mold and allowed to react. At step 1102 the components react to form a polymer material, and at step 1104 the resulting polymer material fills the volume of the mold. Catalysts may be added to aid in the reaction, including but not limited to heat and other chemicals or compounds. Blowing agents can also be added to help the polymer fill the entire mold. At step 1106, the polymer is allowed to solidify. Additional processes may be performed to aid in the polymer solidification, such as cooling the mold. Finally at step 1108, the mold is opened and one or more aquarium life reproductions are removed. In an additional step, dyes or pigments can be added before, during, or after the reactive process, depending on the specific reactive process chosen. Those of ordinary skill will appreciate that reactive polymers may be used in any of a variety of molding processes, and the invention is not limited by the specific reactive polymers or specific method utilized.

In still further embodiments, blocks or sheets of polymeric material can be cut, carved, or otherwise shaped into aquarium life reproductions. Dyes and/or other additives can be added to the polymeric material before or after it is shaped into reproductions.

One or more additives other than dyes and pigments can also be used in any of the above embodiments, either alone or in combination with the dyes and pigments. For instance, nibble inhibitors can be used with a polymer to prevent or discourage fish and other live sea creatures from attempting to eat or chew on the reproductions of aquarium life. Other additives can also be added to make the reproductions inedible. In addition, any of the above mentioned colors and dyes, including fluorescent and glow-in-the-dark dyes and pigments, can be used in any of the above mentioned reproductions of aquarium life.

As discussed above, the invention provides at least one or more advantages to using reproductions of aquarium life formed from a translucent polymer material. Reproductions may be stationary or may be fixed to inhibit movement to undesirable locations within an aquarium. Reproductions may be colorful and may add beauty to an aquarium landscape. Reproductions can accomplish other functions that real sea life cannot, such as glow-in-the-dark. In some embodiments, reproductions can contain nibble-inhibiting additives. In other embodiments, reproductions do not promote the growth of algae.

While various embodiments of the invention have been shown and described, it will be apparent to those of ordinary skill in the art that numerous alterations may be made without departing from the scope of the invention or inventive concepts presented herein. Persons of ordinary skill will appreciate that changes can be made to dimensions, sizing, relative dimensions, materials, blends of materials, combinations of materials, spatial and angular relationships of and between components, and manufacturing processes and other commercial or industrial techniques, all without departing from the scope of the invention. Also, those of ordinary skill will understand that the various components and sub-assemblies described with respect to alternate embodiments may be rearranged, substituted, or combined with each other and that various process steps and sub-processes described above with respect to alternate embodiments may be rearranged, substituted, or combined with each other, all without departing from the scope of the invention. Thus, the invention is not to be limited except in accordance with the following claims and their equivalents.

What is claimed is:

1. An article for use in an aquatic environment said article comprising a translucent polymer material that is configured to resemble invertebrate animal aquarium life, wherein said polymer material comprises a soft, pliable, flexible, gelatinous solid, and said article has a realistic life-like appearance which moves naturally in response to water movement in said aquatic environment.

2. The article of claim 1, wherein the translucent polymer material moves naturally in response to water movement in said aquatic environment and wherein said polymer material comprises memory retaining polymers which resume their shape after deforming due to environmental stress.

3. The article of claim 1, wherein the form of aquarium life that the translucent polymer material is configured to resemble comprises a sea anemone.

4. The article of claim 1, wherein the form of aquarium life that the translucent polymer material is configured to resemble comprises a coral.

5. The article of claim 1, wherein the form of aquarium life that the translucent polymer material is configured to resemble comprises a scallop.

6. The article of claim 1, wherein the form of aquarium life that the translucent polymer material is configured to resemble comprises a clam.

7. The article of claim 1, wherein the form of aquarium life that the translucent polymer material is configured to resemble comprises a sea cucumber.

8. The article of claim 1, wherein the form of aquarium life that the translucent polymer material is configured to resemble comprises a sea apple.

9. The article of claim 1, wherein the form of aquarium life that the translucent polymer material is configured to resemble comprises a jellyfish.

10. The article of claim 1, wherein the form of aquarium life that the translucent polymer material is configured to resemble comprises a nudibranch.

11. The article of claim 1, wherein the translucent polymer material further comprises a color dye.

12. The article of claim 1, wherein the translucent polymer material further comprises a fluorescent dye.

13. The article of claim 1, wherein the translucent polymer material further comprises a glow-in-the-dark dye.

14. The article of claim 1, wherein the translucent polymer material further comprises an additive comprising nibble inhibitors.

15. The article of claim 1, wherein the translucent polymer material is formed at least in part of a material selected from the group consisting of silicone, latex, polyethylene, polypropylene, polystyrene, polyurethane, polyvinyl chloride, memory gel, and castable molding compound.

16. The article of claim 1, wherein the translucent polymer material is formed at least in part of a material selected from the group consisting of thermoplastic and elastomer.

17. An artifact for an aquatic environment comprising:

a body portion having an exterior, wherein said body portion exterior is shaped in accordance with anatomical structure of an aquatic invertebrate species;

wherein said body portion is formed from a soft, supple a soft, pliable, flexible, gelatinous solid polymer, said artifact having a realistic life-like appearance and whereby said artifact moves naturally in response to water movement in said aquatic environment;

wherein said polymer comprises memory-retaining solid gel which is capable of interaction with environmental stresses and subsequent to said interaction is capable of resuming an original form;

wherein said polymer is capable of enduring long periods in an aquatic environment without substantially degrading;

wherein said body portion is translucent and said body portion further comprises dye, whereby said body portion conveys light and color in accordance with said aquatic invertebrate species; and said body portion further comprises any of a plurality of additives.

18. The artifact of claim 17, further comprising:

a plurality of branches, each branch having an exterior, wherein said exterior of each said branch is shaped in accordance with anatomical structures of branches of an aquatic invertebrate species;

said branches are further connected to said body portion;

wherein said branches are formed from said polymer and said branches move in response to water movement said aquatic environment; and wherein said branches further comprise a plurality of additives comprising dye, nibble inhibitor, and algae suppressor.

19. The artifact of claim 17, further comprising:

a plurality of tentacles, each tentacles having an exterior, wherein said exterior of each said tentacle is shaped in accordance with anatomical structures of tentacles of an aquatic invertebrate species;

said tentacles further connected to said body portion;

wherein said tentacles are formed from said polymer and said tentacles move in response to water movement in said aquatic environment; and wherein said tentacles further comprise a plurality of additives comprising dye, nibble inhibitor, and algae suppressor.

* * * * *